United States Patent [19]

Bemb et al.

[11] Patent Number: 5,303,206

[45] Date of Patent: Apr. 12, 1994

[54] METHOD AND APPARATUS FOR MEASURING DISTANCE AND DETERMINING DIRECTION IN A FLUID MEDIUM

[76] Inventors: Richard Bemb, 18 Idlewood Dr., Tonawanda, N.Y. 14150; Edward Crovella, 425 Roycroft, Amherst, N.Y. 14226

[21] Appl. No.: 916,289

[22] Filed: Jul. 17, 1992

[51] Int. Cl.$^5$ ............................................. G01S 3/80
[52] U.S. Cl. .................................. 367/127; 367/910
[58] Field of Search ............. 367/910, 127, 118, 124; 342/139

[56] References Cited

U.S. PATENT DOCUMENTS

| | | | |
|---|---|---|---|
| 2,515,472 | 7/1950 | Rich | 367/137 |
| 3,005,183 | 10/1961 | Mayes | 367/137 |
| 3,068,470 | 12/1962 | Werner | 367/125 |
| 3,286,224 | 11/1966 | Zefting | 367/125 |
| 3,505,638 | 4/1970 | Watson | 367/910 |
| 3,559,161 | 1/1971 | Raudsep | 367/125 |
| 3,713,087 | 1/1973 | Bauer | 367/124 |
| 3,715,577 | 2/1973 | Bohman | 367/124 |
| 3,747,057 | 7/1973 | Brougher | 367/124 |
| 3,789,353 | 1/1974 | Hunter | 367/124 |
| 3,838,593 | 10/1974 | Thompson | 367/125 |
| 3,887,896 | 6/1975 | Ramstedt | 367/910 |
| 3,916,410 | 10/1975 | Elwood | 364/452 |
| 3,944,967 | 3/1976 | Acks et al. | 367/910 |
| 4,516,226 | 5/1985 | Peynaud et al. | 367/127 |
| 4,894,810 | 1/1990 | Jukkala | 367/127 |
| 5,185,725 | 2/1993 | Kent et al. | 367/129 |

*Primary Examiner*—Daniel T. Pihulic
*Attorney, Agent, or Firm*—Robert P. Simpson

[57] ABSTRACT

The invention provides a method and apparatus for determining the combination of distance and relative direction between two locations in a fluid medium. This is accomplished by transmitting a first periodic signal from a first device located at a first location within the fluid medium, receiving the first periodic signal by two or more receivers displaced about the periphery of the second device, wherein one of the receivers receives the signal before the periodic signal is received by any other receiver, initially synchronizing in time the first periodic signal with a second periodic signal generated by the second device, wherein the synchronizing occurs when the first and second devices are proximate one another, at any time thereafter, determining the distance between the first and second devices by measuring a time difference between the first periodic signal, which continues to be received by the second device, relative to the second periodic signal generated by the second device, where the time difference is related to the distance between the first and second devices; and, determining which of the receivers first received the signal, wherein the determining also aids in determining the relative direction between the first and second devices.

41 Claims, 6 Drawing Sheets

METHOD AND APPARATUS FOR MEASURING DISTANCE AND DETERMINING DIRECTION IN A FLUID MEDIUM

BACKGROUND OF THE INVENTION

The present invention relates generally to a method and apparatus for measuring distance and determining direction in a fluid medium. More particularly, the invention pertains to the measurement of distance and determination of direction in a liquid. Still more particularly, the invention provides a navigational method and apparatus for divers and aquanauts to help them determine the distance between two or more points underwater, and to determine the azimuth or relative direction in which a diver should travel to reach a particular reference point.

Underwater navigation for divers, aquanauts, etc. requires that at least two primary elements of information be available to the user—that of azimuth or relative direction to some reference point and that of range to that point. Various investigators have invented means to supply these two primary needs.

SYSTEMS FOR PROVIDING AZIMUTH INFORMATION

At least eight basic methods could be used (not all may have been) to provide the first of the two elements, azimuth information. These methods normally involve the use of one or more ultrasonic beacons and one or more ultrasonic receivers. Each of these methods is described briefly as follows:

TYPE 1: TWO BEACON/ONE RECEIVER SYSTEMS, "Loran-Like" Systems.
TYPE 2: SINGLE BEACON/SINGLE RECEIVER SYSTEMS
   2A: "Sonar-Like" Systems
   2B: Systems with Transponder
   2C: Directional Hydrophone Systems
TYPE 3: SINGLE BEACON/MULTIPLE RECEIVER SYSTEMS
   3A: Phase-sensing Systems
   3B: Time-between-pulses Systems
   3C: Amplitude Comparing Systems
   3D: Correlation Systems TYPE 1: "Loran-Like" Systems locations) emitting synchronized (time-coincident pulses) are used. A receiver detects the time between reception of each pair of synchronized beacon pulses. It can be shown, that, given the location of the two beacons, and the difference in time-of-receipt of a pulse-pair, the receiver is located at some point on a known parabolic line related to the location of the two beacons. A second known parabolic line crossing the first parabolic line exists if one or more additional synchronized transmitters are included in the system. The receiver can then be shown to be located at the intersection of the two parabolic lines (referenced to the beacons), providing the direction line, and the distance also, to the reference beacons.

"Loran-like" systems require complex hardware to maintain synchronization of the transmitted pulses over long periods of time.

U.S. Pat. No. 2,515,472 (Rich) shows a system of this type. Rich provides a modification, however, in which only that line (between beacons) is selected which corresponds to a zero difference in the time-of-receipt of pulse pairs. Also, in Rich, multiple pairs of transmitters are used sequentially, the end result being course control information for the vessel.

TYPE 2A: "Sonar-like" Systems

Systems that use a single beacon with a receiver for reflection sensing are describable as being "sonar-like". The beacon is rotated (usually 360 degrees) and the reflected return is examined on a display. For navigation purposes it is necessary that the reference to which a bearing is desired have a reflected return distinguishable in some manner from all other returns. The complex display required for such systems obviates, practically speaking, use by divers. However, Ramstedt shows an abbreviated variation, not requiring a display, in U.S. Pat. No. 3,887,896.

TYPE 2B: Systems With Transponder

A modification to system 2A is possible in which a transponder is added to the system and placed at the physical location of the reference (to which the direction is desired). The effort of the human operator is lessened (since an operator decision is not required) and an automated display of direction and range becomes available.

TYPE 2C: Directional Hydrophone Systems

Acoustic-horn-pattern dependent systems use one or more receivers whose sensitivity is direction limited. In the simplest implementation, using a single receiving sensor, the sensor whose sensitivity is limited in direction, as by a "horn", is rotated as necessary until a maximum amplitude signal is detected, providing the direction line to the reference beacon. Alternatively, several such sensors may be placed on a small circle, each with its maximum sensitivity directed along a radius of and away from the circle. The need for mechanical rotation of a sensor is then obviated determined by the direction of the sensor (or sensors) sensing a maximum signal level. Directional hydrophone systems have, probably, the lowest resolving power for determining a direction line because of the difficulty arising in limiting the acoustic aperture of the sensor(s). Further, an amount of complexity arises because a pivoted single rotating sensor with a fairly large "horn" is required, or because, alternatively, multiple non-rotating sensor/horns are used.

U.S. Pat. Nos. 3,005,183 (Mayes), 3,713,087 (Bauer) and 3,747,057 (Brougher) show variations of such a system.

TYPE 3A: Phase Sensing Systems

In this scheme, two or more separated receivers are used to sense the continuous wave emitted by a single beacon. The phase (position in a single sine wave cycle) of the signal sensed by each of the receivers provides information used to determine the direction to the transmitter. Phase sensing systems require fairly complex electronic computation to accurately determine a required direction-line from the two phase values sensed. This may require, among other hardware, an electronic synthesizer to generate a reference sine wave against which the two sensed sine waves may be compared to determine the phase values of the sensed sine waves.

U.S. Pat. Nos. 3,286,224 (Zefting) and 3,505,638 (Watson) show systems of this type. Watson shows a system providing information only as to a 180 degree sector in which the azimuth to the beacon exists. The user is required to interpolate the azimuth from that information.

TYPE 3B: Time-between-pulses Systems

In this method, two separated receivers detect pulse modulated transmissions from a single beacon. The time between receipt of each pulse at the receivers provides only approximate information on the direction to the transmitter (insufficient information is provided to the receiver). In addition this system is ambiguous, indicating two possible directions to the transmitter. A third receiver can be used to remove this ambiguity. Type 3B systems require fairly complex electronic computation hardware for use in determining accurately the required direction-line being given the two given time-between-pulse values.

U.S. Pat. No. 3,715,577 (Bohman) discloses a variation of such a system.

TYPE 3C: Amplitude-Comparing-Receiver Systems

Amplitude-comparing receiver systems use a single transmitter. Two receiver sensors (fixed as to the distance between them) and a "comparator" are used. The comparator determines the relative amplitude of the two received signals and from that information determines the direction (approximately) to the reference transmitter. The information of relative amplitude determines two possible directions (an ambiguous situation) and a third receiver can be used to remove that ambiguity. Such systems may be implemented, typically, as those in which a separate sensor and receiver are associated with each of two earpieces worn by a diver. Each of the two receivers incorporates circuitry to "enhance" and aid in differentiation of the two acoustic signals applied to the diver's ears. Amplitude sensing systems of this type can only supply approximate information for a direction-line and are especially vulnerable to the "reflected-signal problem" discussed infra. This system requires a very complex headgear system for the diver.

U.S. Pat. No. 3,789,353 (Hunter et al.) discloses such a system as used to localize speech signals received by divers.

TYPE 3D: "Correlation" Systems

Correlation systems work with a single source such as a noise generating element and two receiving sensors. The two sensors are located equidistantly on a crossbar from a central vertical pivot on the crossbar; the sensors face in a common direction perpendicular to the crossbar. Ideally, the two wave patterns sensed when the sensors face the reference beacon, and the crossbar is perpendicular to the reference transmitter, should be exact duplicates in time. A mathematical technique is used to determine the "level of duplication," that is, the correlation. The crossbar is rotated as necessary so that the highest correlation exists and the direction line to the reference transmitter is then known as being perpendicular to the direction of the crossbar. Correlation based systems require the complexity of a rotating receiver-and-cross-bar assembly and, being in part similar to type 3C systems, are especially vulnerable also to the "reflected-signal problem" discussed infra.

U.S. Pat. No. 3,838,593 (Thompson) shows such a system as used to precisely locate an underwater noise source.

SOME CHARACTERISTICS OF AZIMUTH DETERMINING SYSTEMS

All of these systems (types 1, 2, and 3), by their nature, when examined in depth, require that their receiver be active, that is "open," at all, or a major percentage of the time that they are in use. A significant disadvantage then follows in that they all are susceptible to reflected signals. That is, the receiver senses the transmitted signal and, simultaneously, senses signals reflected from surfaces adjacent to either the transmitter or the receiver. This occurs due to the fact that the receiver is "open" at all times before or after the desired emission from the beacon(s); reflected signals can and will be accepted simultaneously to and before/after primary signals. Those reflected signals, when they occur, can appear as being "random" and "chaotic" in their effect on the proper operation of each of these systems. Until the distance to reflecting elements in the vicinity of the beacon(s) and/or the receiver(s) is very large relative to that of the distance from the beacon(s) to the receiver(s) this problem exists. In shallow water, as is the norm for much diving activity, all of the systems shown in this discussion suffer to a high degree from this problem—the "reflected-signal problem." (Type 2A, "Sonar-like" systems, which are typically rotating 360 degrees and displaying all reflected signals, do not suffer from the "reflected-signal problem" because the operator viewing the display "mentally eliminates the redundant reflections.")

The next disadvantage, in relative importance, of these systems is that all of them, in one way or another, show a high level of electronic or mechanical complexity (relative to that which would be desirable). Type 1 systems using two (or more) beacons are more complex, per se, than those involving a single beacon. Type 2A, "sonar-like" systems are more complex than any others from the standpoint of the much greater beacon power that they require (relative to the others for operation at equivalent ranges). Type 2B systems require a transponder in addition to a beacon and receiver. Type 2C systems require a rotating fixture or multiple separated receivers. Type 3A, 3B and 3D systems incorporate significant complexity in that they require computing circuitry in the receiver system to determine and display the direction line to the beacon. In addition, "correlation" systems, 3D, require rotation systems with fixtures, Type 3C systems require complex circuitry to "enhance" and aid in differentiation of the two acoustic signals applied to the diver's ears as discussed supra.

A direction sensing system is needed which eliminates completely, or almost completely, the very serious "reflected-signal problem", and which drastically reduces the complexity problem while maintaining the high-resolution capabilities needed for determining the required direction line to the beacon.

U.S. Pat. No. 3,747,057 (Brougher) shows a system that continuously eliminates undesired signals in receivers adjacent to primary receivers. However, undesired reflected signals impinging on the primary receivers cannot be eliminated for proper operation of the system and it is almost fully susceptible to the very serious "reflected-signal problem" affecting all underwater navigation systems of the type considered here, that is, those using ultrasonic media.

U.S. Pat. No. 3,559,161 (Raudsep) shows a system that eliminates undesired signals in receivers during the time of receipt of the pulse portion of the transmitted signals. However, being a phase-sensing system, its receiver channels must be "open" during the time of sinusoidal modulation of the transmitted signals. For the typical figures shown for the practice there the receiver channels are "open" 98% of the time.

SYSTEMS FOR PROVIDING RANGE INFORMATION

At least four basic methods are known for providing range information for underwater navigation. Three are expansions of methods described above for obtaining azimuth information so they are listed below with the same arbitrary type numbers assigned previously. The fourth, Type 2D, single beacon/single receiver phase-sensing systems, does not have an azimuth-determination capability per se.

TYPE 1: TWO BEACON/ONE RECEIVER SYSTEMS, "Loran-Like"

TYPE 2: SINGLE BEACON/SINGLE RECEIVER SYSTEMS

2A: "Sonar-Like" Systems

2B: Systems with Transponder

2D: Phase-sensing systems

TYPE 1: "Loran-Like" Systems

"Loran-like" systems make available range information in addition to azimuth information as described above when a third beacon is used.

The "Loran-like" system shown in United Stated Pat. No. 2,515,472 (Rich), listed above, is limited to supplying azimuth information.

TYPE 2A: "Sonar-Like" Systems

"Sonar-like" systems, as summarized above, inherently can supply range information in addition to azimuth information without the need for additional hardware. Range information and azimuth information are presented on the same display.

TYPE 2B: Systems Using a Transponder

Similarly in this regard to "Sonar-like" systems, systems using a transponder can inherently supply range information in addition to azimuth information without the need for additional hardware.

Such a system is illustrated in a variation in U.S. Pat. No. 3,068,470 (Werner) wherein a different media and use than those considered here are involved. The media is a modulated radio frequency signal used for determining the arrival of a missile in a predetermined slant range from a target.

TYPE 2D: Phase-sensing systems

Phase sensing systems for obtaining azimuth information are summarized above. However, when such systems are expanded, in order to also obtain range information, a complex additional burden is imposed on the system receiver; in some manner the exact phase (relative to time) of the signal at the instant of transmission must be supplied to the receiver. The difference in phase of the signal, as received, relative to the phase of the signal, as transmitted, is then sufficient information, under limited conditions, for determining the range to the transmitter. Under other conditions, especially those of longer ranges, the phase information required may be that of both the sinusoidal signal itself and that of a sinusoidal modulation of that signal.

In an area not related to underwater navigation by divers, the positioning of mining vessels, and in which another medium, electromagnetic radiation, is used, U.S. Pat. No. 3,916,410 (Elwood) and others show the use of atomic clocks to make the additional phase information available. For example, two vessels bearing beacons and a third vessel bearing a receiver, may be initially placed in very close proximity and have their phase references synchronized. Atomic clocks used on the three vessels then make possible the maintenance of that synchronism over long periods thereafter after the vessels are separated. Of course, atomic clocks are extremely expensive which prohibits their use by most divers.

SOME CHARACTERISTICS OF RANGE DETERMINING SYSTEMS

A related system of this type (one based on ultra-stable clocks) used underwater by divers, necessarily with ultrasonic media, would present major difficulties in use—extreme susceptibility to the "reflection problem" previously discussed, susceptibility to natural and man-made underwater noises, and hardware complexity. Radio frequency (r.f.) reflections from earth and other surfaces, in an r.f. above water system, are relatively less problematic than sound reflections from bottom, water, and other surfaces, in an ultrasonic underwater system. In the latter the diver is often moving near the bottom, near reefs, and near underwater life. Also, r.f. noise, above water, can be shown to be relatively less significant than sound media noise, underwater, generated by wave action, underwater life, motorboats, etc. Additional techniques, such as reflection-elimination methods and filtering of received signals are required in underwater use of such a system.

A range determining system is required for underwater use which is relatively impervious to the "reflected-signal problem"; which necessarily for that underwater use eliminates the complexity of phase sensing systems by using time-of-pulse measurement; which uses a more compatible and less expensive timing media than atomic clocks—pulsers coordinated by the use of stable crystal oscillators; which incorporates an automatic system to solve the necessity of synchronizing those pulsers; and which maintains the high-resolution capabilities needed for precisely determining the required range values for the user.

SUMMARY OF THE INVENTION

The invention broadly includes a method of determining distance between two locations in a fluid medium, comprising transmitting a first periodic signal from a first device located at a first location within the fluid medium, receiving the first periodic signal by a second device located within the fluid medium, initially synchronizing in time the first periodic signal with a second periodic signal generated by the second device, wherein the synchronizing occurs when the first and second devices are proximate one another, at any time thereafter, determining the distance between the first and second devices by measuring a time difference between the first periodic signal, which continues to be received by the second device, relative to the second periodic signal generated by the second device, where the time difference is related to the distance between the first and second devices.

A method is also provided for determining relative direction between two locations in a fluid medium, comprising transmitting a signal from a first device located at a first location within the fluid medium, receiving the signal by two or more receivers displaced about the periphery of a second device located within the fluid medium, wherein one of the receivers receives the signal before the signal is received by any other receiver; and, determining which of the receivers first received the signal, wherein the determining also aids in determining the relative direction between the first and second devices.

A method is also provided for determining the combination of distance and relative direction between two locations in a fluid medium, comprising transmitting a first periodic signal from a first device located at a first location within the fluid medium, receiving the first periodic signal by two or more receivers displaced about the periphery of the second device, wherein one of the receivers receives the signal before the periodic signal is received by any other receiver, initially synchronizing in time the first periodic signal with a second periodic signal generated by the second device, wherein the synchronizing occurs when the first and second devices are proximate one another, at any time thereafter, determining the distance between the first and second devices by measuring a time difference between the first periodic signal, which continues to be received by the second device, relative to the second periodic signal generated by the second device, where the time difference is related to the distance between the first and second devices; and, determining which of the receivers first received the signal, wherein the determining also aids in determining the relative direction between the first and second devices.

An apparatus is also disclosed and claimed for implementing the method of the invention.

Accordingly, a primary object of the present invention is to provide a method and apparatus for determining the distance between two locations in a fluid medium and the relative direction between two locations in a fluid medium.

A secondary object of the present invention is to provide a method and apparatus whereby a diver may move within a radius away from his dive originating point having the knowledge at all times of the exact direction and range to that originating point (a ship, buoy, dock, etc.) The method and apparatus functions regardless of conditions of visibility which may exist for the diver, including especially those of inadequate visibility (murky water, small underwater obstructions, nighttime darkness, etc.)

Still a further object of the invention is to provide a method and apparatus whereby a diver may move toward an underwater object having the knowledge at all times of the exact direction and range to that object (an underwater reef, a sunken ship, etc.) Again, this object exists for all conditions of visibility which may exist for him. In this case a transmitter, battery operated, is carried by the diver on a first dive to any desired under-water object and deposited there. On subsequent dives, the indicator on the receiver will, of course, provide azimuth and range information to that underwater object instead of back to the base from which the dive originated.

DETAILED DESCRIPTION OF THE INVENTION

At the outset, it should be clearly understood that the drawings are to be read together with the specification, and are to be considered a portion of the entire "written description" of this invention, as required by 35 U.S.C. 112. Also, identical reference numerals on different figures refer to identical elements of the invention.

The essence of the invention, as demonstrated by the claims, is a method and apparatus for measuring distance and determining direction in a fluid medium. In the preferred embodiment illustrated herebelow, the invention may be used by underwater divers to locate their boat or other underwater objects, although other uses will be readily apparent to those having ordinary skill in the art. For example, the invention may be used as a navigational aid by ships travelling in a waterway or channel, wherein the pilot steers his ship in response to signals transmitted by beacons appropriately placed within the channel. The invention could also be used to mark underwater objects (shipwrecks, etc.) in order to easily locate them at a later time.

The following definitions apply throughout the detailed description which follows:

"Beacon"—refers to a device which transmits an ultrasonic signal within a fluid medium. In one application, the beacon is suspended underwater from a boat.

"Receiver"—in a preferred embodiment, refers to a device which receives the ultrasonic signal from the beacon, compares the received signal with its own internally generated signal, and determines and displays information about the distance and azimuth of the beacon relative to the receiver.

"Azimuth"—refers to the relative direction between two points in a fluid medium. In a preferred embodiment, it refers to the direction in which a person located at the receiver must travel in order to reach the beacon, or vice versa.

"Range"—refers to the distance between two locations in a fluid medium. In a preferred embodiment, it refers to the distance between the beacon and the receiver.

"Fluid medium"—refers to any fluid in which sound may travel. In a preferred embodiment, the fluid is water.

THE APPARATUS

Figure 1A:
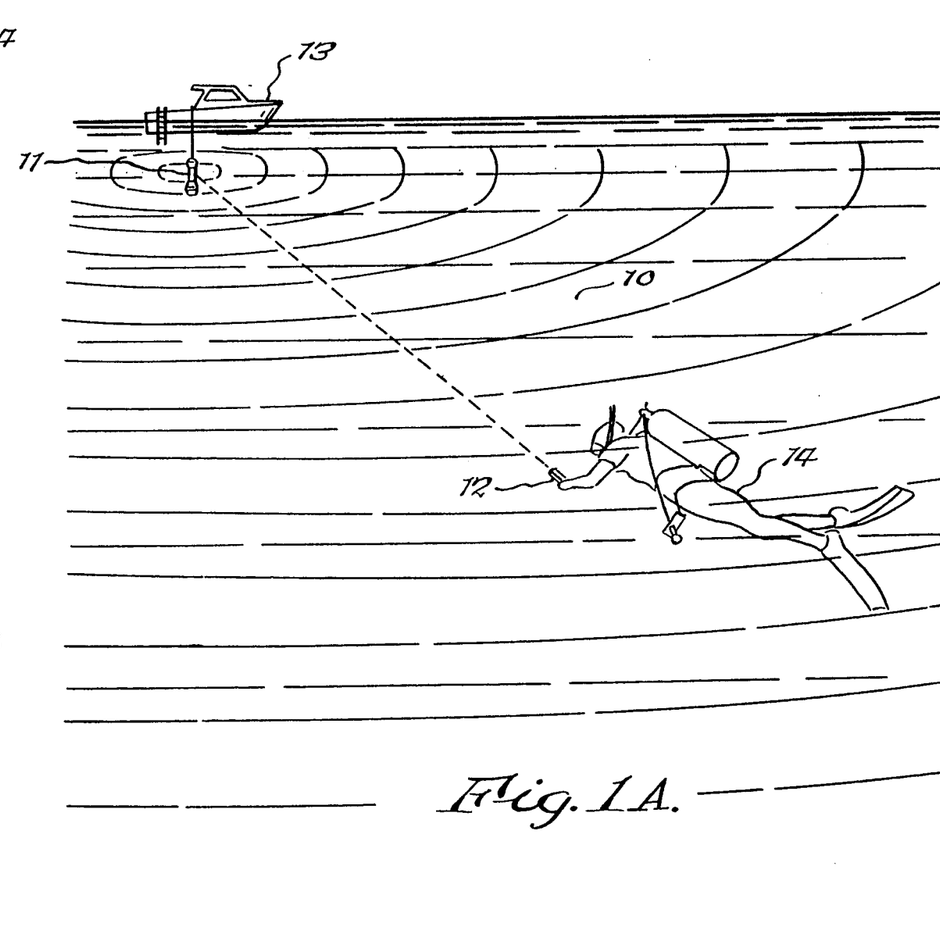
FIG. 1A illustrates pictorially one manner in which the present invention may be used, i.e., by a diver locating and swimming back to his boat.

FIG. 1A broadly illustrates a preferred embodiment of the apparatus 10 of the invention, which comprises beacon 11 and receiver 12. In one application, the beacon may be suspended from boat 13 while receiver 12 may be held in the hand or strapped to the wrist of diver 14.

Figure 2:
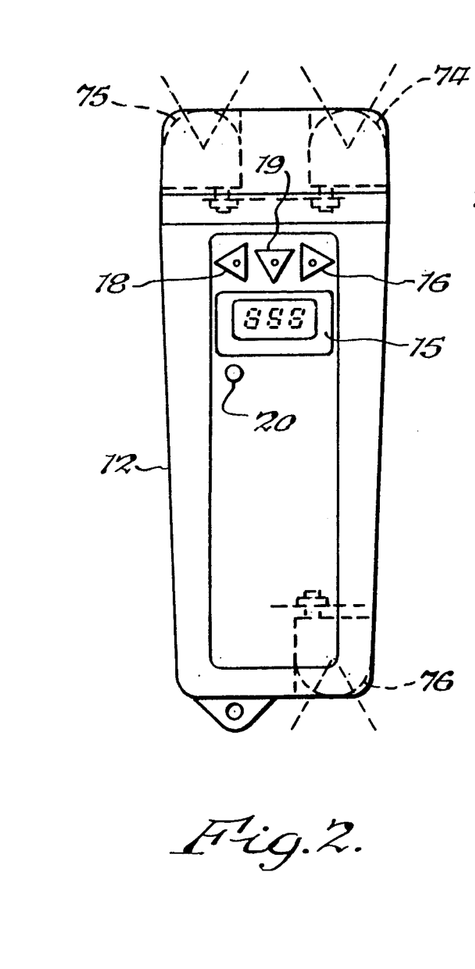
FIG. 2 is a top view of the hand-held receiver unit of the invention.

Receiver 12 is shown in a top view in FIG. 2. Mounted to the top of receiver 12 is digital range display 15 which indicates the distance in feet between receiver 12 and beacon 11. Displays 16, 18 and 19, which may comprise light emitting diodes, indicate in which direction the beacon is relative to the receiver. For example, if display 16 is active, the diver should swim to the right to reach the beacon; if display 18 is active, the diver should turn to the left; and if display 19 is active, the diver is traveling in the wrong direction (i.e., away from the boat) and should turn 180 degrees in order to reach the boat. In addition to changing his direction of travel the diver should reorient the receiver (a partial rotation in the horizontal plane) so that displays 16 and 18 are active (fluttering) alternately. An engraved reference line on the receiver then indicates the exact direction to the beacon. Only one of the displays can be active at any one time. Although light emitting indicators are disclosed in the preferred embodiment, it is suggested that, in the alternative, sound could be used by equipping the diver with headphones and emitting a sound for the right ear to tell the diver to turn right and a sound in the left ear to tell the diver to turn left, etc. This modification might be especially useful in very murky water or for use by visually impaired divers. Such a modification would require additional circuitry within the understanding of those having ordinary skill in the art. Also shown in FIG. 2 is low battery indicator 20. Finally, receiver 12 also comprises transponders 74, 75 and 76 which receive the ultrasonic signals from beacon 11.

Figure 1B:
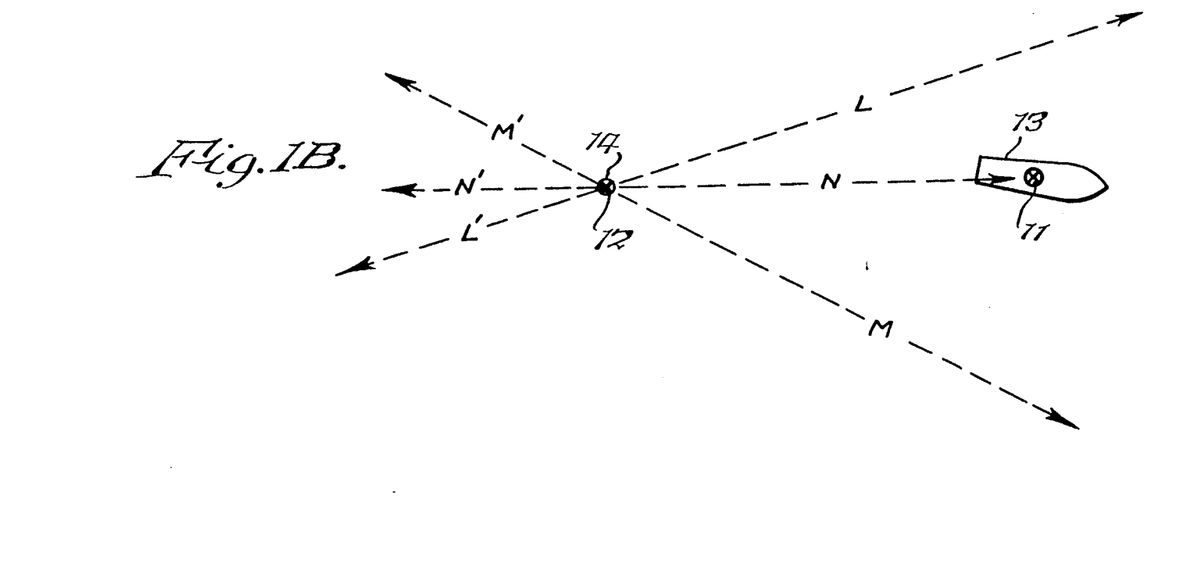
FIG. 1B is a top schematic view which further illustrates how the invention may be used by a diver in locating his boat.

To better illustrate one use of the invention, reference is made to FIG. 1B, which is a top view showing boat 13 and a schematic representation of the location of diver 14 (illustrated by an "X"). As seen in the figure, and with reference to FIG. 2 as well, if the diver is swimming toward the boat along path L, display 16 will light to indicate that the diver should veer to the right. If the diver is swimming toward the boat along path M, display 18 will light to indicate that the diver should veer to the left. If the diver is swimming toward the boat along path N, displays 16 and 18 will both flicker on and off to indicate the diver is swimming in the right direction. Finally, if the diver swims away from the boat along either of paths L', M' or N', display 19 will light to indicate that the diver is swimming away from the boat.

Figure 3:
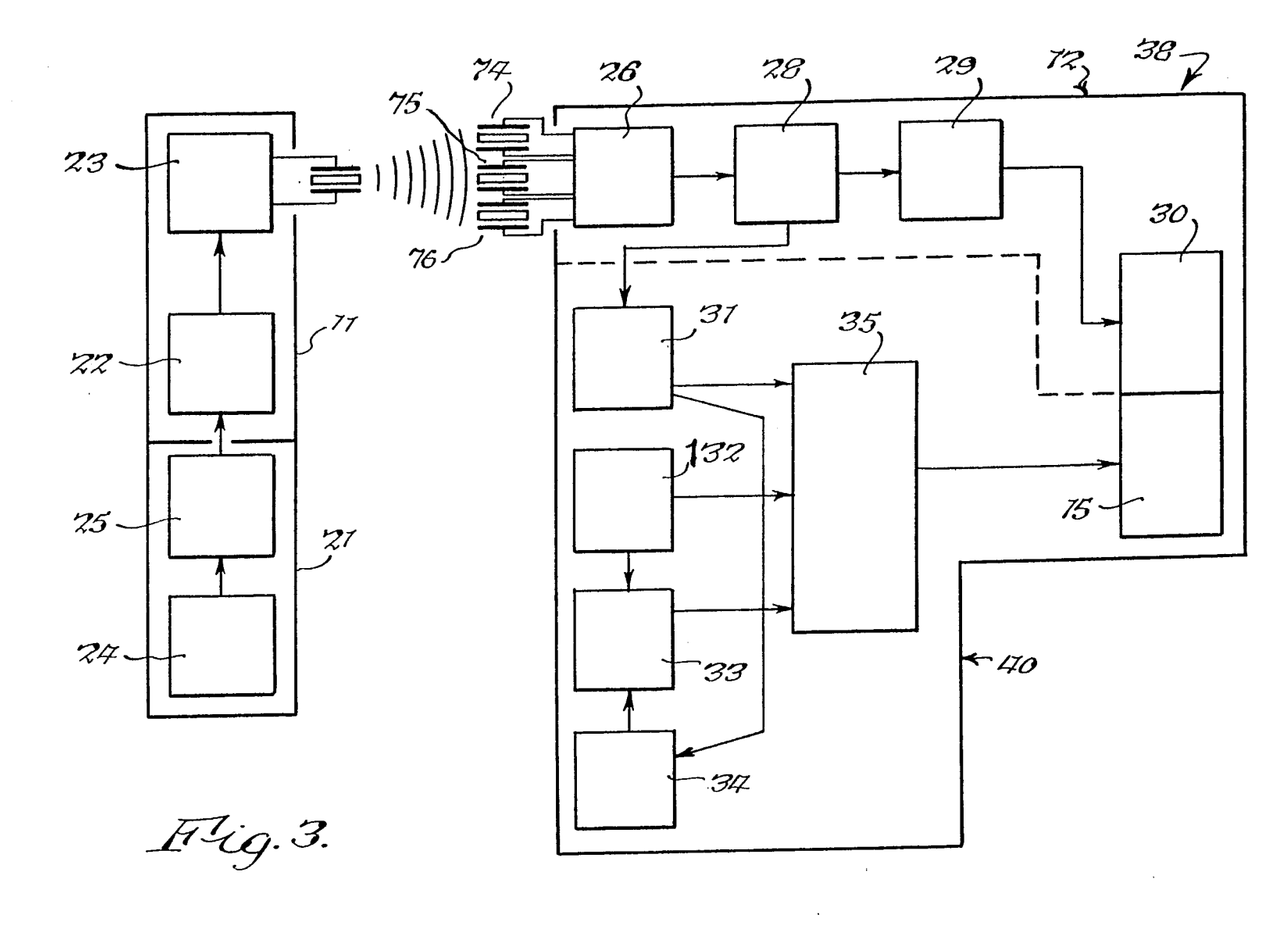
FIG. 3 is a generalized block diagram of the apparatus of the invention.

FIG. 3 shows a block diagram of the apparatus aspect of the invention. Beacon 11 (referred to in the claims as a first device) comprises "T" pulser 21, wave shaper 22, and electrical-to-ultrasonic transducer 23, which together comprise a means for transmitting a first periodic signal through the fluid medium. "T" pulser 21 is comprised of ultra-stable oscillator 24 (nominally 4,915,200 Hz.) and counter/divider 25 (divide by 1,048,576). The output of "T" pulser 21 is therefore an ultra-stable square wave of a nominal 4.6875 Hz. The leading edge of each of these square waves is used by wave shaper 22 to initiate a wave train consisting of 15 sine wave cycles at a nominal 29,500 Hz. (ultrasonic). Each of these wave trains activates transducer 23 which radiates in all directions, but primarily horizontally, in the water medium.

Receiver 12 (referred to in the claims as a second device) comprises azimuth determination section 38 and range determination section 40. Azimuth section 38 is comprised of ultrasonic-to-electrical transducer array 26 (3 transducers nominally), signal processor 28, reflection lock-out array 29, azimuth L.E.D. indicator 30 (which comprises "right" indicator L.E.D. 16, "left" indicator L.E.D. 18, and "wrong way" indicator L.E.D. 19 as shown in FIG. 2). The ultrasonic-to-electrical transducer array comprises a means for receiving the periodic signal sent by the beacon. Range determination section 40 is comprised of ultrasonic-to-electrical transducer array 26, signal processor 28, "S" pulser 31, input-for-count generator 132, "R" pulser 33, automatic "T/R" synchronizer 34, range counter/calculator 35 and range display 15.

Beacon 11 and receiver 12 are powered from some source which is not shown so as to simplify the drawings. When the beacon is ship-borne, as is the most usual case, its power will be obtained from the ship's electrical power source. In the case of the receiver its power will be obtained from some type of portable power supply such as a battery.

Each radiated wave train is sensed by receiver 12 as shown in FIG. 3. Receiver 12 is comprised of two sections, an azimuth-determining section 38 and a range-determining section 40.

AZIMUTH DETERMINATION

Figure 4:
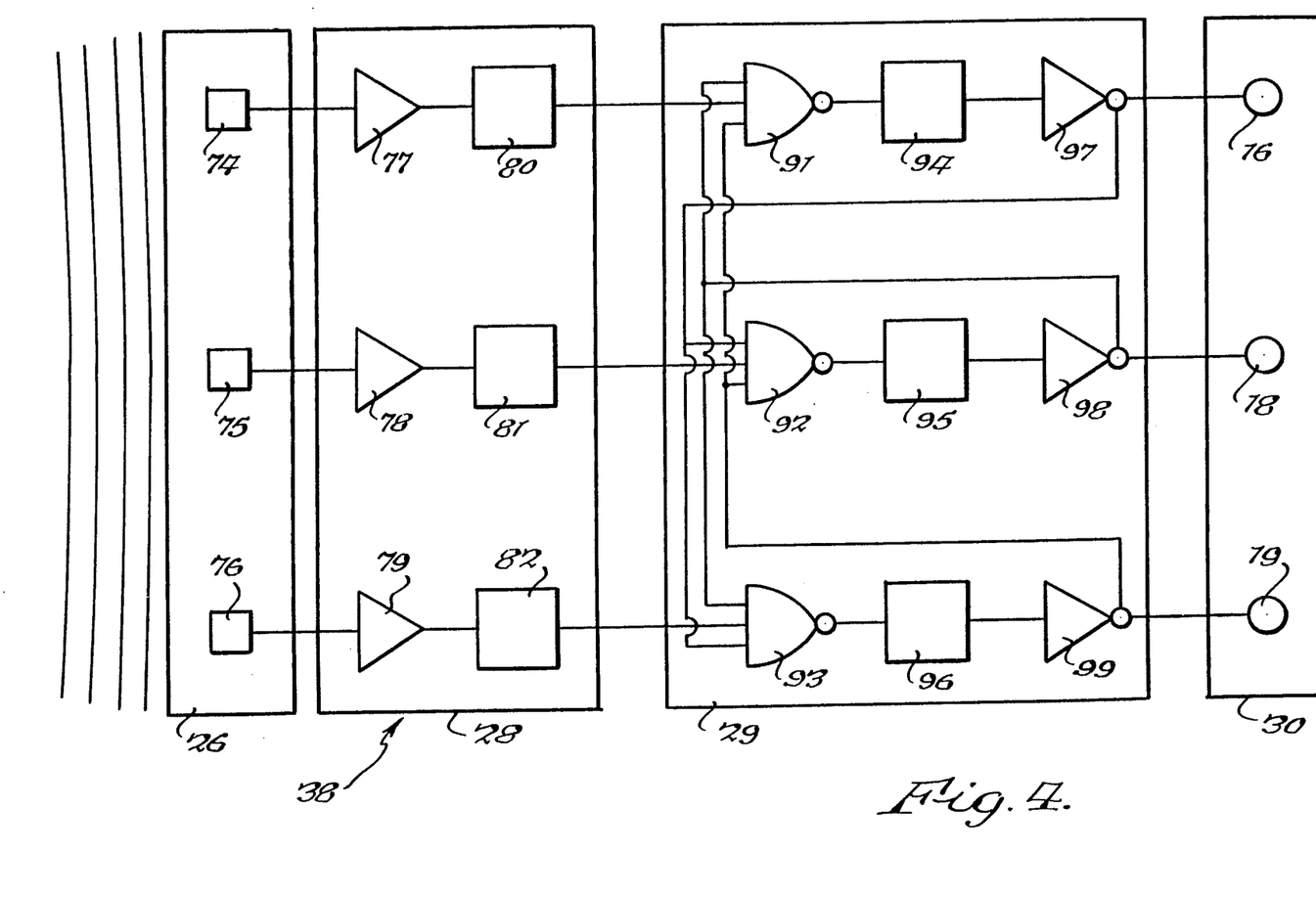
FIG. 4 is a generalized block and schematic diagram of the azimuth-determining section of the receiver unit of the invention.

It is seen in FIG. 4 that three signal paths (transducer to signal processor to reflection lock-out array to L.E.D. indicator) exist in the azimuth-determination section of the receiver. Each of the three transducers with its associated L.E.D. indicator is physically located on the periphery of the receiver, essentially on a circle. During normal operation the user holds the receiver so that the circle lies in a horizontal plane. In addition, a sighting line is engraved on the face of the receiver in a direction perpendicular to the line connecting the "right" and "left" indicator L.E.D.'s.

At all times only one of the three L.E.D. indicators will be lit when pulse trains are received because the transducer for the path containing that indicator will be closest to the transmitter, and reflection lock-out array 29 will "lock out" the other two paths as described infra. The diver orients the receiver with his hand so that the "right" indicator L.E.D. and the "left" indicator L.E.D. pulse alternately. The associated transducers are thus placed along the pulse wavefronts and are thus equidistant from the beacon. (Actually, rapid fluttering of those two indicator L.E.D's occurs under this condition, the fluttering causing both L.E.D.s to appear to light simultaneously.) The line connecting the two indicators is then, of course, perpendicular to both the exact line to the transmitter and to the engraved sighting line on the receiver. By orienting the receiver in this manner, the result is that the receiver sighting line points directly to the transmitter, providing the diver the azimuth information that he needs.

Figure 5:
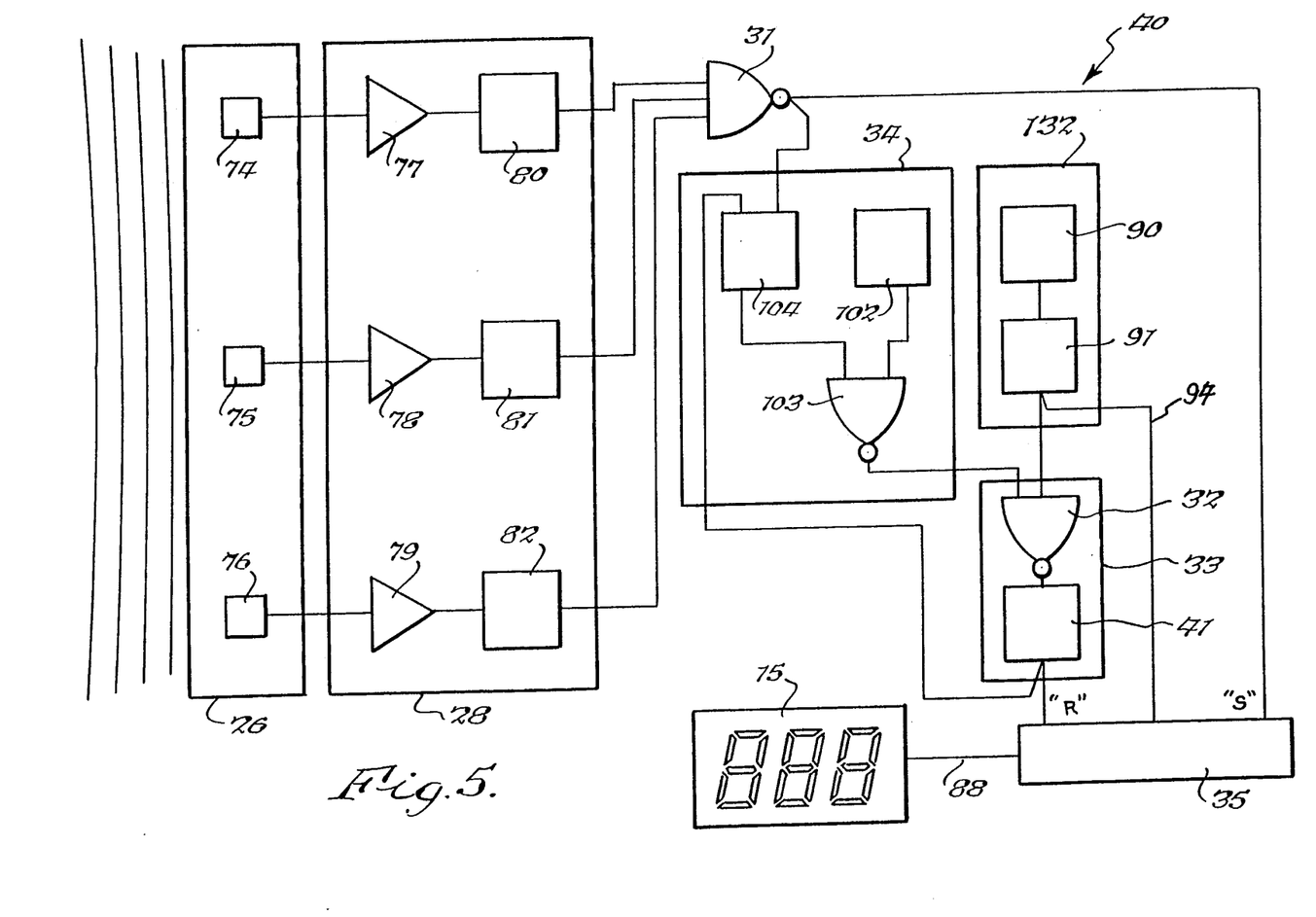
FIG. 5 is a block and schematic diagram of the range-determining section of the receiver apparatus of the invention.

Transducer array 26 and signal processor 28 serve a dual purpose, being used in both the azimuth and range sections of receiver 12 (see FIGS. 4 and 5).

REFLECTION LOCK-OUT USING A "TIME WINDOW"

FIG. 4 shows a block diagram of the azimuth-determining section 38 of receiver 12. The three trigger pulses resulting from activation of transducers 74, 75 and 76 and received from the trigger-shapers 80, 81, and 82 during normal operation are applied to the three NAND gates 91, 92, and 93. One of the pulses will occur first in time, of course, depending upon the orientation of the transducers to the wavefront of the radiated wave trains. That first-received effect of the wave front, passed by the associated gate 91, 92, or 93, in turn triggers the associated pulse stretcher for a nominal 0.200 seconds during which time the pulse stretcher itself will not respond to any possible further inputs. The stretched pulse activates the associated logical inverter 97, 98, or 99. The inverted output of the associated logical inverter is applied, "fed back", to the two non-associated NAND gates effectively "turning them off" and preventing the passage through them of the second-and-third-in-time effects of the wave front. (Normally the wave front strikes the 3 transducers sequentially.) The associated L.E.D. indicator is wired to respond (emit light) to the inverted signal from the associated logical inverter. That associated L.E.D. indicator is activated for the time determined by the associated inverter, that is 0.200 seconds. The next wave front arrives in 0.213 seconds, that is ↓.6875 Hz., after the selected L.E.D. de-activated. In effect the "time-window" that is open for signals from the beacon is 6%, or 0.013/0.213, of the total time. Since precisely synchronized "clocks" (pulsers) are used in beacon 11 and receiver 12 this "time window" can be shortened further.

Figure 6A:
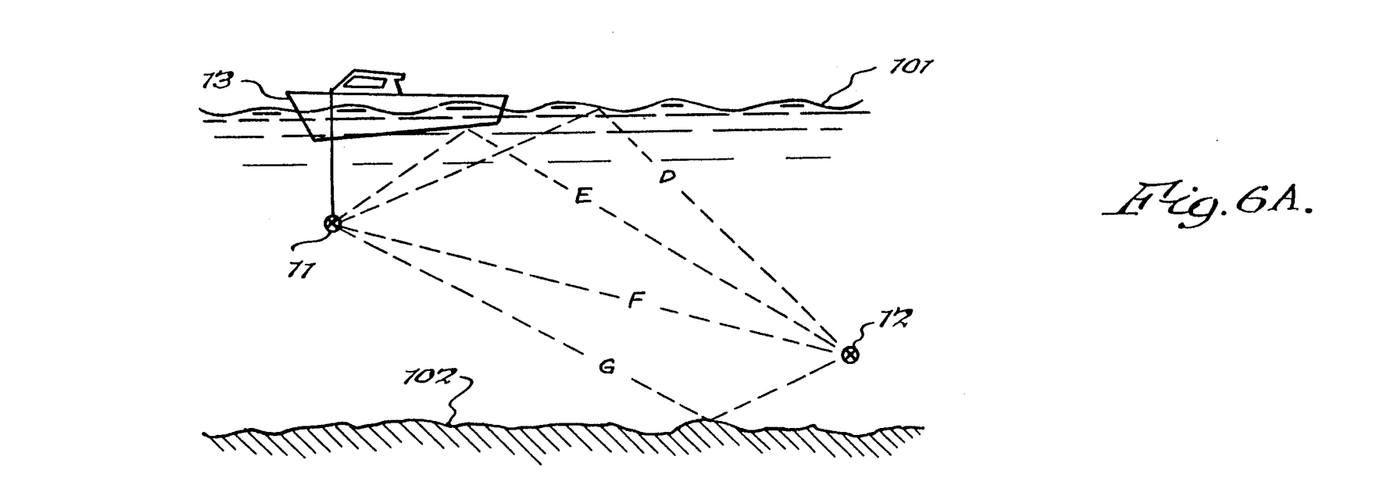
FIG. 6A illustrates various paths that an ultrasonic wave may travel in water from a beacon to a receiver.
Figure 6B:
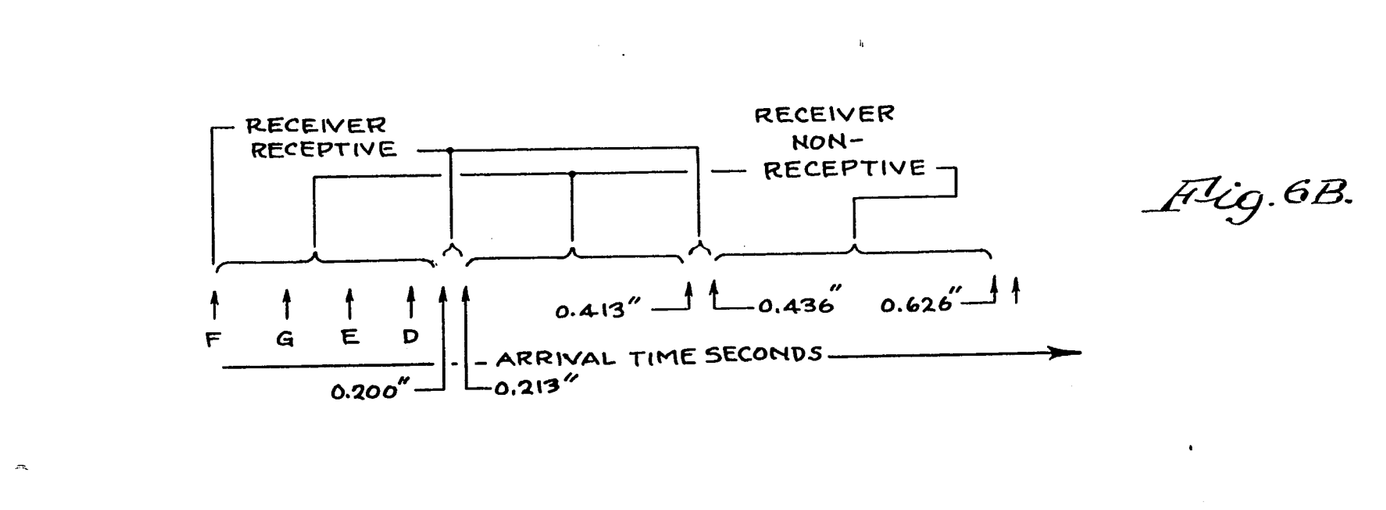
FIG. 6B illustrates the method by which the invention locks out or inhibits unwanted reflected signals.

To evaluate the benefits of this very narrow time-window, used for "reflection lock-out", reference is made to FIGS. 6A and 6B which show a space diagram and a corresponding time-based diagram, respectively, for the travel of a single wave train to the receiver. In FIG. 6A, it is seen that path F is the direct path of the wave train in moving from beacon 11 to receiver 12. However, the wave train, radiating omnidirectionally, also travels to the receiver by "reflection" paths G, E, D, and others not shown. Path D is shown as a reflection off the surface 101; path E is shown as a reflection off the bottom of boat 13; while path G is shown as a reflection off the bottom 102.

Referring to the corresponding time-based diagram of FIG. 6B, it is seen that the wave train traveling by the direct path, F, arrives first, thereby providing the necessary information that is required (with other information) for the receiver's determination of range to the beacon. Immediately after this first arrival, feedback and timing circuits place all channels of the receiver in a non-receptive state to any subsequently received signals (those arriving via "reflection paths") for 0.200 seconds. Finally, the brief "time-window" (receiver in its receptive mode) follows for the arrival of the next direct-traveled wave train to arrive at time 0.213 seconds.

RANGE DETERMINATION

FIG. 5 shows a block diagram of the range section of receiver 12. This section is comprised of transducer array 26, signal processor 28, "S" signal pulser 31, input-for-count generator 132, "R" receiver pulser 33, automatic "T/R" synchronizer 34, range counter/calculator 35, and range display 15.

Transducer array 26 is comprised of right, left, and rear ultrasonic-to-electrical transducers 74, 75 and 76, respectively. Signal processor 28 is comprised of right, left, and rear amplifier/filters 77, 78 and 79, respectively, plus right, center, and rear trigger shapers 80, 81 and 82, respectively.

Range calculation is performed in range counter/calculator 35. An "R" pulse resets counter/calculator 35 to zero and activates its count mechanism. (The time of this "R" pulse is coincident with the "T" pulse occurring at the time of emission of a wave train from the transmitter, as is explained following.) The count registered in counter 35 then increments at 4,800 Hz. which is the frequency of input-for-count signal 94 applied to the counter. An "S" pulse (its time is coincident with the arrival at receiver 12 of the above wave train) terminates the count action and the total count arrived at remains stored in range counter/calculator 35. That stored value is numerically equal to the distance traveled by the wave train. This follows from the fact that during the time that the wave train is in travel from beacon 11 to receiver 12 the count in counter/calculator 35 is incrementing at a 4,800 Hz. rate, the latter being numerically equal to the 4,800 feet/second velocity of the wave-train.

Coincidentally with the occurrence of an "S" pulse counter/calculator 35 transfers that stored count (numerically equal to the distance traveled by the wave train) through multi-wire system 88 to range display 15. Range display 15 displays values in the range (nominal) of 0 to 999 feet. The display updating occurs at a 4.6875 Hz. rate since that is the frequency of the "S", and also the "R", pulses.

"S", "R", AND "INPUT-FOR-COUNT" SIGNALS

See FIG. 5 for the following description of the generation of the "S", "R", and "input-for-count" signals: The "S" pulses emitted by "S" pulser 31 are coincident in time with the leading edge of the ultrasonic wave trains sensed by transducer array 26. "S" pulser 31 emits up to 3 pulses when each wave train is sensed by transducer array 26. However, it is the first of these pulses that deactivates (stops) counter/calculator 35 and only that first one is termed the "S" pulse. (For practical purposes no time delay exists in transducer array 26, signal processor 28 and "S" pulser 31.) In addition to being applied to the "stop" input of range counter/calculator 35 the "S" pulses are also applied to automatic "T/R" synchronizer 34 as explained in a following section.

The generation of "R" pulses is as follows: The input element of input-for-count generator 132 is ultra-stable oscillator 90 whose frequency is a nominal 4,915,200 Hz. (That frequency is identical to that of ultra-stable oscillator 24 shown in "T" pulser 3 on FIG. 3.) Counter/divider 91 divides that nominal frequency by 1,024 resulting in a 4,800 Hz. signal frequency which is used as the input-for-count signal applied via wire 94 to counter/calculator 35. That input-for-count signal is also applied to NAND gate 32 and normally is passed on to counter/divider 41. (Only briefly, during automatic "T/R" synchronization, that signal is inhibited from being passed on to counter/divider 41, as is explained following.) Counter/divider 41 divides that 4,800 Hz. signal frequency by 1,024 resulting in a 4.6875 Hz. frequency for the "R" pulses applied to the "start" input of counter/calculator 35. (The action of the "T/R" synchronizer, detailed following, assures that those "R" pulses are time coincident with the "T" pulses which initiate the pulse trains emitted from beacon 1.)

Thus, it is seen that the invention includes a means for determining the distance between the beacon and the receiver by measuring the time difference between the first periodic signal transmitted by the beacon, which continues to be received by the receiver, and the second periodic signal generated within the receiver. The time difference is related to the distance between the two devices. For example, multiplying the time difference by the speed of sound in the fluid medium results in a determined distance.

OPERATION OF THE "T/R" SYNCHRONIZER

As described previously and as shown in FIG. 5, the pulses emitted by "S" Pulser 31 are applied to range counter/calculator 35 and to automatic "T/R" synchronizer 34. However, they have no effect at "T/R" synchronizer 34 except during a 0.45 second period at dive initiation time during which "T/R" synchronizer 34 is automatically activated. At that time transmitter 11 and receiver 12 are in close proximity in the water medium. A water-pressure sensing switch (not shown) which is part of "T/R" synchronizer 34 activates "T/R" synchronizer 34 for that 0.45 second period. Additional circuitry (also not shown) prevents operation of "T/R" synchronizer 34 at any other time. Thus, it is seen that the synchronization initially occurs automatically when the receiver is immersed in the fluid medium, since synchronization is activated by the water pressure switch. However, it should be obvious that the synchronization could be activated manually as well, by using a manual switch instead of a pressure activated switch.

Figure 7:
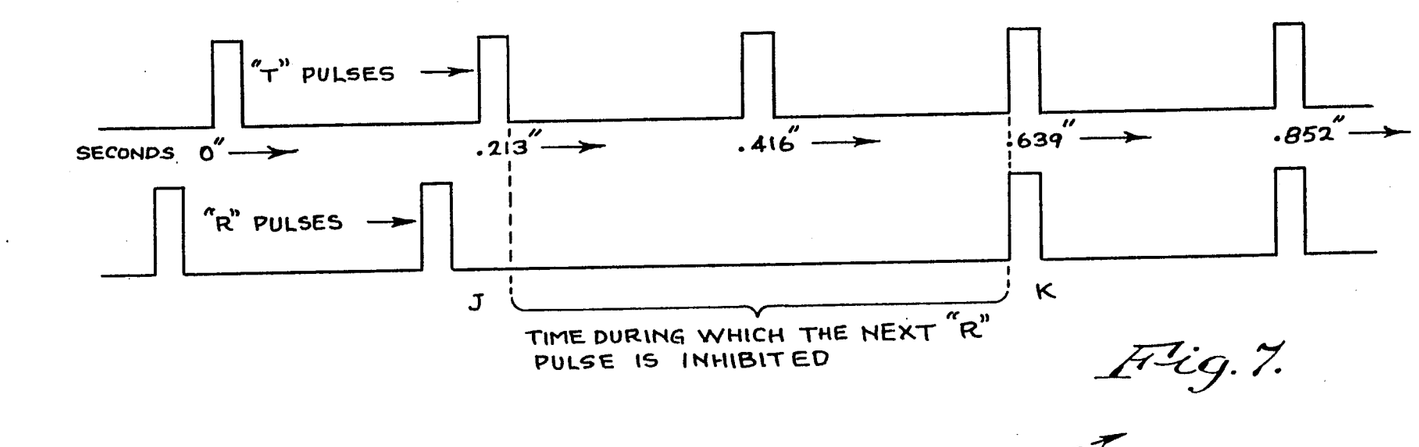
FIG. 7 is a timing diagram which illustrates how the invention synchronizes the transmitted pulses from the transmitter with the internally generated pulses of the receiver.

As described previously for range determination, a necessary element of the range determining system is that the "T" pulses in beacon 11 and the "R" pulses in receiver 12 be perfectly synchronized in time. At dive initiation time, as stated above, and only at that time, "T/R" synchronizer 34 automatically performs this function. In other words, "T/R" synchronizer 34 is a means for initially synchronizing in time the first periodic signal sent by the beacon with a second periodic signal (the "R" pulses) generated by the receiver. This synchronization occurs when the beacon and receiver are proximate one another in the fluid medium. As shown in FIG. 7, the "T" pulses are uniformly spaced in time, as are the "R" pulses initially uniformly spaced in time. Once the diver enters the water, however, the "R" pulses are delayed, or inhibited, for the necessary amount of time in order to synchronize the "R" pulses with the "T" pulses. During this brief period during which synchronization is obtained the "R" pulses are not uniformly spaced in time. Once synchronization has been obtained, however, both the "R" and "T" pulses occur at the same times.

"T/R" synchronizer 34 performs this function by causing "R" pulses (sensed at one of its inputs) to be delayed as required until they are exactly coincident with "T" pulses (sensed at the other of its two inputs). The details of this action, that is the delay of "R" pulses, occurring only during the 0.45 second period during dive initiation time, are described as follows. (The normal operation of "R" pulser 33, other than during that 0.45 second period, is described above.)

Counter/divider 41 normally counts input pulses (4,800 Hz.) from zero upward to the count of 1,023 (its maximum count capability is 1,023, not 1,024 as might be expected). The next input pulse, nominally the 1,024th, automatically resets counter/divider 41 to a zero count reading and causes the emission of an output pulse (the "R" pulse). This action—count to 1,023, reset to zero on the next input pulse and simultaneously emit an "R" pulse is the basic activity of counter/divider 41. However, by temporarily inhibiting (by use of NAND Gate 32) a necessary number of input pulses to counter/divider 41, an "R" pulse from counter 41 can be delayed as required for that "R" pulse to be coincident in time with a "T" pulse. Once an "R" pulse has been delayed sufficiently to be coincident with a "T" pulse all subsequent "T" and "R" pulses will be coincident since they have identical 4.6875 Hz. frequencies. Counter/divider 41 may be visualized as a pseudo/memory element used for adjusting that synchronism. Since the individual sources of the "T" and "R" pulses are two identical ultra-stable oscillators, that synchronism, once created, will be maintained indefinitely.

SYNCHRONIZATION SEQUENCE

With reference to FIG. 5, the detailed steps which occur during the 0.45 second synchronizing period are as follows:

1. Dive Initialization One-shot device 102 generates a positive-going 0.45 second pulse which is applied to the right hand input of NAND Gate 103, effectively activating "T/R" synchronizer 34;

2. The first "R" pulse (actually only that pulse's positive transition) from counter/divider 41 which occurs during that period resets flip-flop 104 placing the output of 104 (called Q-inverted) high. As described above, the "R" pulse is the pulse emitted at the time that counter/divider 41 resets to a count of zero;

3. Steps 1 and 2 above result in a logical "false" occurring at the left hand input of NAND Gate 32;

4. For this condition, which causes the inhibition of the output of gate 32 (that is its output state cannot change), the count stored in counter/divider 41 cannot change, remaining zero;

5. The next-occurring "T" pulse from "S" pulser 31 "sets" flip-flop 104 changing its output (Q-inverted) to a logical "false". "T" and "S" pulses are coincident here since beacon 11 and receiver 12 are proximate at this time;

6. The output condition of NAND gate 103 accordingly changes to "true" permitting NAND gate 32 to again "pass" its 4,800 Hz. input to counter/divider 41;

7. Recall that counter/divider 41 has been storing a zero since step 4, and until step 6;

8. Step 6 allows counter/divider 41 to resume counting (beginning at zero) toward 1,023. It will subsequently reset to zero and emit an "R" pulse in accord with its characteristic action described above. This will be in $\frac{1}{4}$.6875 seconds based on 1,024 (1,023 plus 1) counts at the input pulse frequency, 4,800 Hz;

9. Note that the next following "T" pulse (after step 5) applied to flip-flop 104 also occurs in $\frac{1}{4}$.6857 seconds (the inverse of its frequency);

10. Steps 8 and 9 show that the next "T" and "R" pulses (after the "T" pulse of step 5) occur simultaneously;

11. Since the ultimate sources for the "T" and "R" pulses are two ultra-stable (with respect to temperature and aging) oscillators, the two pulse trains will remain synchronized indefinitely for all practical purposes;

It will be understood that the foregoing description is illustrative of the invention and should not be considered as limiting and that other embodiments of the invention are possible without departing from the invention's spirit and scope, as embodied in the following claims.

We claim:

1. A method of determining distance between two locations in a fluid medium, comprising:
   transmitting a first periodic signal from a first device located at a first location within said fluid medium, wherein said first device is capable of transmitting a signal only and is incapable of receiving a signal;
   receiving said first periodic signal by a second device located within said fluid medium;
   initially synchronizing in time said first periodic signal with a second periodic signal generated by and contained within said second device, wherein said synchronizing occurs when said first and second devices are proximate one another; and
   at any time thereafter, determining the distance between said first and second devices by measuring a time difference between said first periodic signal, which continues to be received by said second device, relative to said second periodic signal generated by and contained within said second device, where said time difference is related to the distance between the first and second devices.

2. The method of claim 1 and including the further step of indicating the determined distance.

3. The method of claim 1 wherein said fluid medium is water.

4. The method of claim 1 wherein said first periodic signal is an ultrasonic signal.

5. The method of claim 1 wherein said first device is a beacon positioned underwater, and said second device is carried by an underwater diver.

6. The method of claim 1 wherein said distance is determined by multiplying the time difference by a known speed of travel of the first periodic signal in the fluid medium.

7. The method of claim 1 including the further step of inhibiting reception of subsequent signals by said second device for a predetermined period of time after reception of said first periodic signal for the purpose of avoiding inaccurate distance measurement as a result of reception of reflected signals.

8. The method of claim 1 wherein said synchronizing is initiated automatically by means of a pressure switch when said second device is initially immersed in said fluid medium.

9. A method of determining relative direction between two locations in a fluid medium, comprising:
   intermittently transmitting a pulse train from a first device located at a first location within said fluid medium, wherein said fluid device is capable of transmitting a signal only and is incapable of receiving a signal;
   receiving said pulse train by two or more receivers displaced about the periphery of a second device located within said fluid medium, wherein one of said receivers receives said pulse train before said pulse train is received by any other receiver; and
   determining which of said receivers first received said pulse train, wherein said determining also aids in determining the relative direction between said first and second devices.

10. The method of claim 9 and including the further step of indicating the relative direction between said first and second devices.

11. The method of claim 9 wherein said fluid medium is water.

12. The method of claim 9 wherein said pulse train is an ultrasonic signal.

13. The method of claim 9 wherein said first device is a beacon positioned underwater, and said second device is carried by an underwater diver.

14. A method of determining distance and relative direction between two locations in a fluid medium, comprising:
   transmitting a first periodic signal from a first device located at a first location within said fluid medium, wherein said first device is capable of transmitting said first periodic signal only and is incapable of receiving a signal;
   receiving said first periodic signal by two or more receivers displaced about the periphery of a second device, wherein one of said receivers receives said signal before said periodic signal is received by any other receiver;
   initially synchronizing in time said first periodic signal with a second periodic signal generated by and contained within said second device, wherein said synchronizing occurs when said first and second devices are proximate one another;
   at any time thereafter, determining the distance between said first and second devices by measuring a time difference between said first periodic signal, which continues to be received by said second device, relative to said second periodic signal generated by said second device, where said time difference is related to the distance between the first and second devices; and,
   determining which of said receivers first received said signal, wherein said determining also aids in determining the relative direction between said first and second devices.

15. The method of claim 14 and including the further step of indicating the determined distance.

16. The method of claim 14 and including the further step of indicating the relative direction between said first and second devices.

17. The method of claim 14 wherein said fluid medium is water.

18. The method of claim 14 wherein said first periodic signal is an ultrasonic signal.

19. The method of claim 14 wherein said first device is a beacon positioned underwater, and said second device is carried by an underwater diver.

20. The method of claim 14 including the further step of inhibiting reception of subsequent signals by said second device for a predetermined period of time after reception of said signal transmitted by said first device for the purpose of avoiding inaccurate determination of distance and relative direction between said first and second devices as a result of reception of reflected signals.

21. The method of claim 14 wherein said synchronizing is initiated automatically by means of a pressure switch when said second device is initially immersed in said fluid medium.

22. An apparatus for determining distance between two locations in a fluid medium, comprising:
   means for transmitting a first periodic signal from a first device located at a first location within said fluid medium, wherein said first device is capable of transmitting only and is incapable of receiving a signal;

means for receiving said first periodic signal by a second device located within said fluid medium;

means for initially synchronizing in time said first periodic signal with a second periodic signal generated by and contained within said second device, wherein said synchronizing occurs when said first and second devices are proximate one another;

means for determining, at any time thereafter, the distance between said first and second devices by measuring a time difference between said first periodic signal, which continues to be received by said second device, relative to said second periodic signal generated by said second device, where said time difference is related to the distance between the first and second devices.

23. The apparatus of claim 22 and including means for indicating the determined distance.

24. The apparatus of claim 22 wherein said fluid medium is water.

25. The apparatus of claim 22 wherein said first periodic signal is an ultrasonic signal.

26. The apparatus of claim 22 wherein said first device is a beacon positioned underwater, and said second device is carried by an underwater diver.

27. The apparatus of claim 22 including means for inhibiting reception of subsequent signals by said second device for a predetermined period of time after reception of said first periodic signal for the purpose of avoiding inaccurate distance measurement as a result of reception of reflected signals.

28. The apparatus of claim 22 wherein said means for initially synchronizing is activated automatically by a pressure switch when said second device is initially immersed in said fluid medium.

29. An apparatus for determining relative direction between two locations in a fluid medium, comprising:

means for intermittently transmitting a pulse train from a first device located at a first location within said fluid medium, wherein said first device is capable of transmitting a signal only and is incapable of receiving a signal;

means for receiving said pulse train by two or more receivers displaced about the periphery of a second device located within said fluid medium, wherein one of said receivers receives said pulse train before said pulse train is received by any other receiver; and means for determining which of said receivers first received said pulse train, wherein said means for determining also aids in determining the relative direction between said first and second devices.

30. The apparatus of claim 29 and including means for indicating the relative direction between said first and second devices.

31. The apparatus of claim 29 wherein said fluid medium is water.

32. The apparatus of claim 29 wherein said pulse train is an ultrasonic signal.

33. The apparatus of claim 29 wherein said first device is a beacon positioned underwater, and said second device is carried by an underwater diver.

34. An apparatus for determining distance and relative direction between two locations in a fluid medium, comprising:

means for transmitting a first periodic signal from a first device located at a first location within said fluid medium, wherein said first device is capable of transmitting said first periodic signal only and is incapable of receiving a signal;

means for receiving said first periodic signal by two or more receivers displaced about the periphery of said second device, wherein one of said receivers receives said signal before said periodic signal is received by any other receiver;

means for initially synchronizing in time said first periodic signal with a second periodic signal generated by and contained within said second device, wherein said synchronizing occurs when said first and second devices are proximate one another;

means for determining, at any time thereafter, determining the distance between said first and second devices by measuring a time difference between said first periodic signal, which continues to be received by said second device, relative to said second periodic signal generated by said second device, where said time difference is related to the distance between the first and second devices; and, means for determining which of said receivers first received said signal, wherein said determining also aids in determining the relative direction between said first and second devices.

35. The apparatus of claim 34 and including means for indicating the determined distance.

36. The apparatus of claim 34 and including means for indicating the relative direction between said first and second devices.

37. The apparatus of claim 34 wherein said fluid medium is water.

38. The apparatus of claim 34 wherein said first periodic signal is an ultrasonic signal.

39. The apparatus of claim 34 wherein said first device is a beacon positioned underwater, and said second device is carried by an underwater diver.

40. The apparatus of claim 34 including means for inhibiting reception of subsequent pulse trains by said second device for a predetermined period of time after reception of said pulse train for the purpose of avoiding inaccurate determination of relative direction between said first and second devices as a result of reception of reflected pulse trains.

41. The apparatus of claim 34 wherein said means for initially synchronizing is activated automatically by a pressure switch when said second device is initially immersed in said fluid medium.

* * * * *